March 16, 1965  K. S. SMITH  3,173,238
HAY TEDDERS
Filed March 7, 1962  4 Sheets-Sheet 1
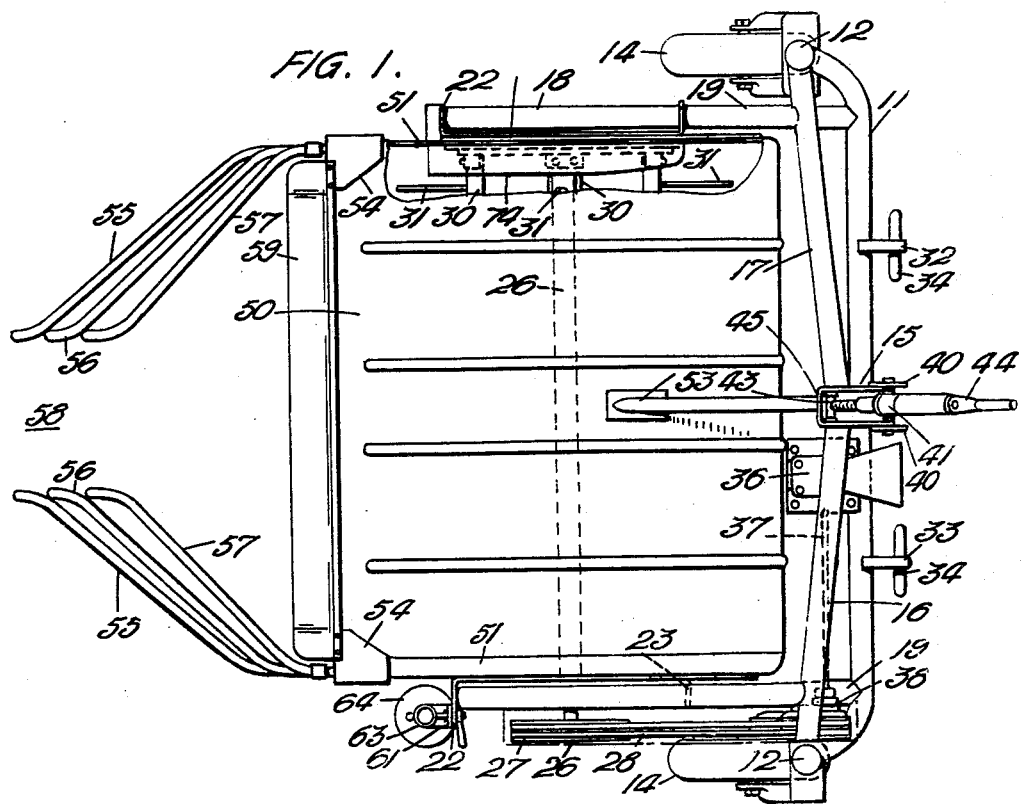
Inventor
Keith Stafford Smith March 16, 1965     K. S. SMITH     3,173,238
HAY TEDDERS
Filed March 7, 1962                                    4 Sheets-Sheet 2
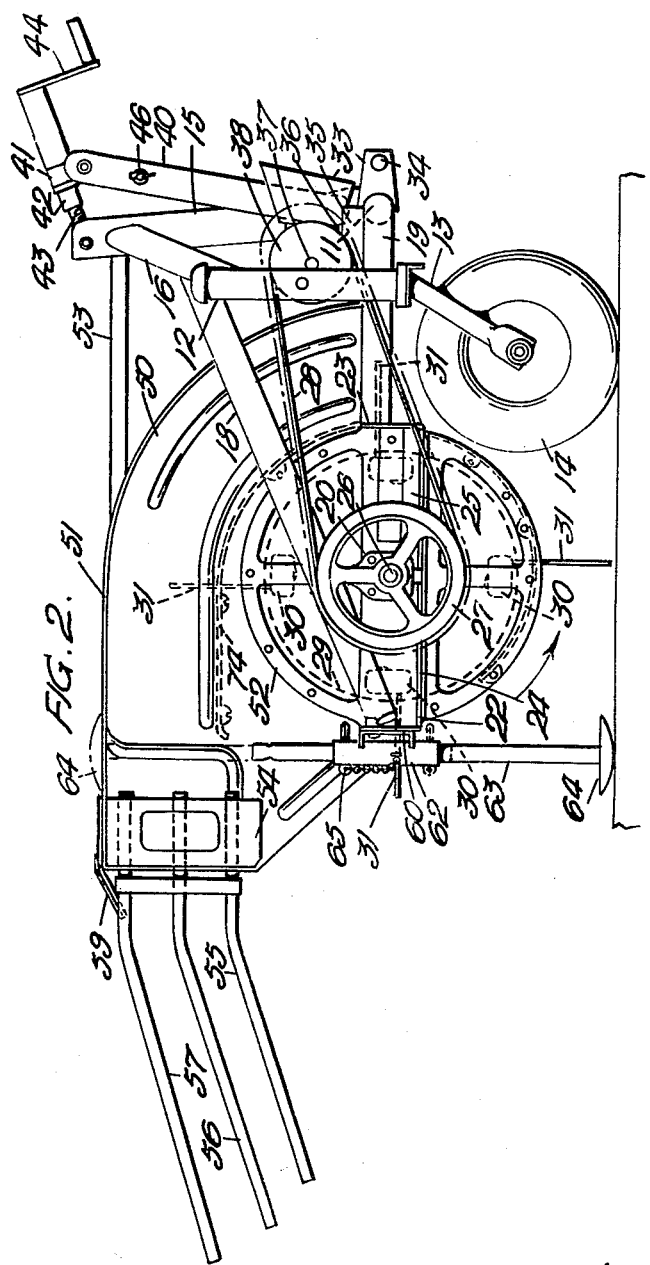
Inventor
Keith Stafford Smith March 16, 1965  K. S. SMITH  3,173,238
HAY TEDDERS
Filed March 7, 1962  4 Sheets-Sheet 3
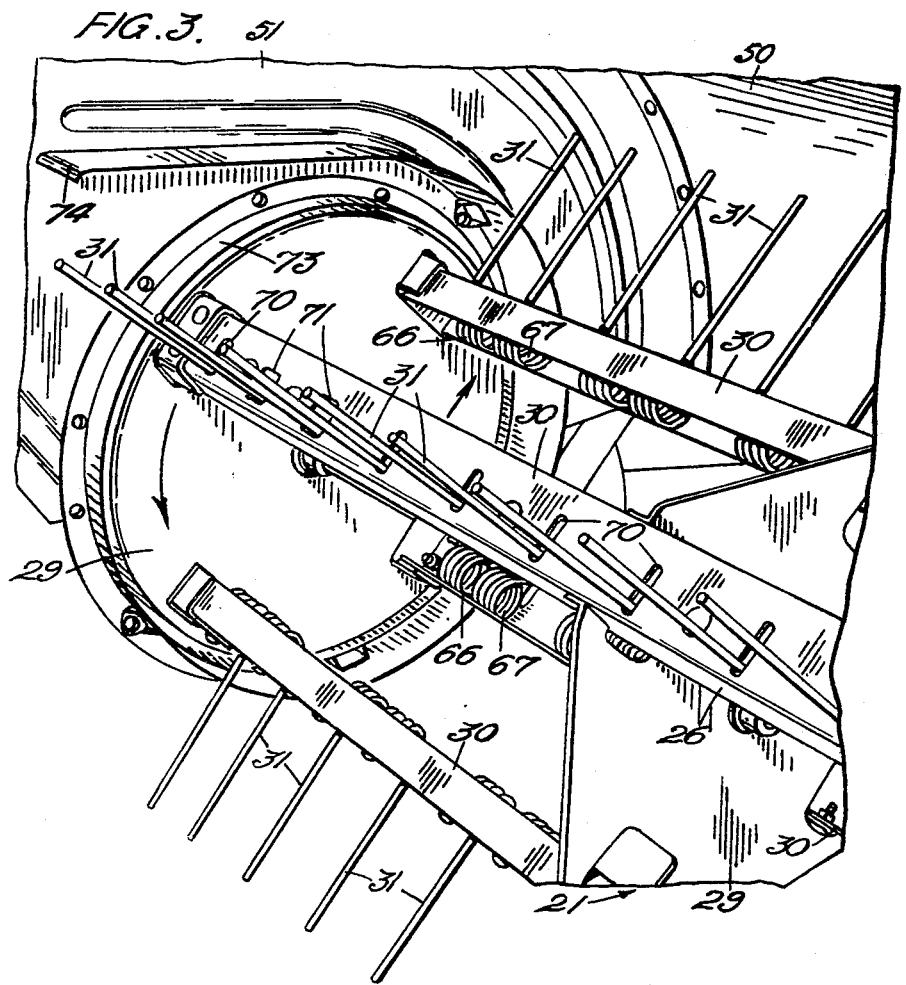
Inventor
Keith Stafford Smith
By Hooper Leonard & Quell
his attorneys

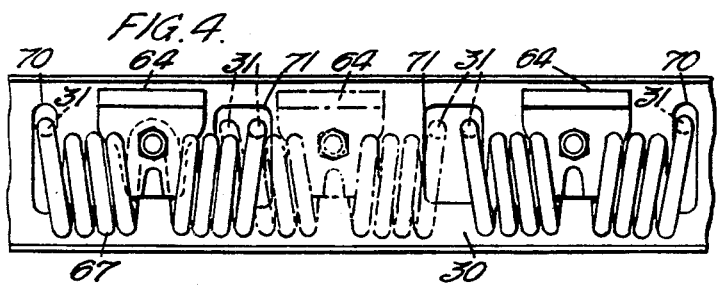
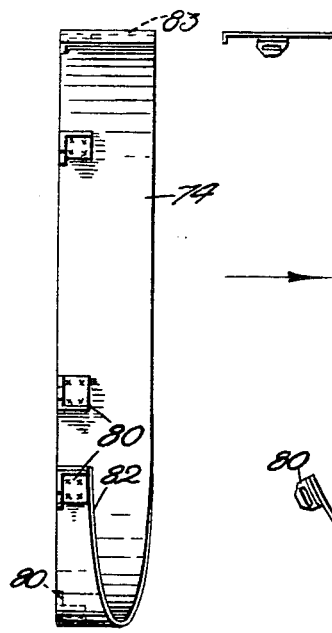
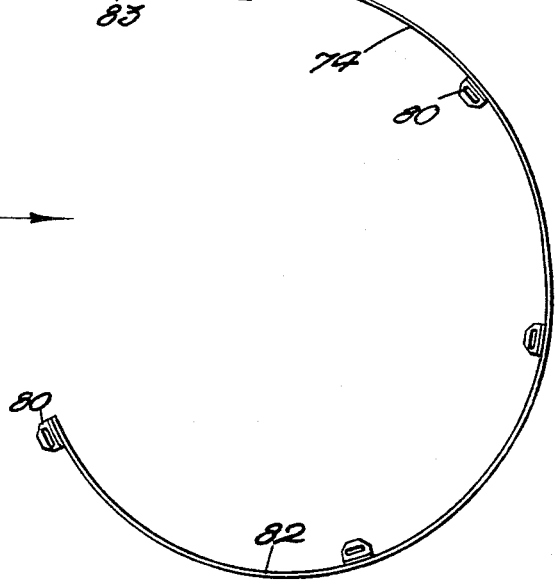

United States Patent Office 3,173,238
Patented Mar. 16, 1965

3,173,238
HAY TEDDERS
Keith Stafford Smith, Stamford, England, assignor to Blackstone & Company Limited, Stamford, England, a company of Great Britain
Filed Mar. 7, 1962, Ser. No. 178,168
3 Claims. (Cl. 56—372)

This invention relates to hay tedders of the type in which a rotating frame, carrying tines, is located in a cowling which is open toward the rear of the tedder and is driven round in such a direction as to pick up hay on the tines and carry it first upwardly and forwardly and then throw it out of the cowling in an aerated condition behind the tedder. The rotating frame or tine-carrier usually comprises end-plates on a shaft and bars connecting the end-plates, which bars carry the tines. It is sometimes found that the crop on which the machine is operating tends to pack around the end plates between the cowling and the tine-carrier and clog the rotation of the tines. It is an object of the present invention to obviate this.

According to the present invention, within the cowling, there are disposed stationary guard-members which extend around the frame of the tine-carrier close to the sides of the tines thereon from a position near where the tines engage the crop to the position where the crop is thrown off them, so as to prevent the crop from dispersing laterally away from the tines.

Preferably the guard-members are shaped so that the portions of them which are presented to the sides of the tines follow approximately helical paths from the position where the crop is engaged toward the position where the crop is discharged, that is to say, they approach the sides of the tines more nearly toward the position of discharge. The cowling may be closed in at the sides and the guard-members may consist of strips of sheet metal projecting inwardly from the sides of the cowling with their edges approaching the sides of the tines.

In the preferred construction the frame of the tine-carrier comprises circular end-plates and the cowling carries stationary flanges within the guard-members which flanges approach the end-plates closely and further prevent entry of the crop between the end-plates and the cowling.

The following is a description, by way of example, of one construction in accordance with the invention, reference being made to the accompanying drawings in which:

FIGURE 1 is a plan of the hay tedder,

FIGURE 2 is an enlarged side elevation of the device shown in FIGURE 1,

FIGURE 3 is a perspective view of the parts inside the cowling,

FIGURE 4 is a detail showing the method of securing the tines,

FIGURE 5 is a side elevation of one of the guard-members, and

FIGURE 6 is a front elevation of the same.

The tedder is built up on a frame which comprises a transverse horizontal tube 11 at the front of the tedder, the ends of which are bent rearwardly and united to two upright tubular sockets 12 to act as bearings for the pivots of mountings 13 for castor wheels 14. In the centre of the horizontal tube 11 there is an upstanding column 15 of channel-section from the upper end of which there extend two tubes 16, 17, inclined sligthly downwards and united at their outer ends to the castor wheel sockets 12. Between the castor wheel sockets 12 at each side of the frame, there are on each side two rearwardly extending tubular members 18, 19, one united to the lower tubular cross-member 11 of the frame and the other to one of the inclined upper members 16 or 17 thereof.

These two tubular side members 18, 19 converge towards the rear and the upper one 18 passes above bearings 20 for a tine-carrier 21 (FIGURE 3) and terminates at a point where it is welded to an upright plate 22. The lower rearwardly extending side member 19 of the frame terminates before it reaches the bearing 20 for the tine-carrier in another upright plate 23 and the two upright plates are united by horizontal plate-members 24 and vertical stiffener plates 25 which form a frame or tray on each side of the frame, to carry the tine-carrier bearing 20 on that side.

Through the bearings there passes a horizontal shaft 26 from side to side of the tedder and from one side the shaft projects beyond the bearing and carries a double-grooved V-pulley 27 for a belt 28. On the shaft 26, inside the bearings 20, are three spiders (or discs) 29 and between the spiders there extend a number of tine-carrying bars 30 from side to side of the machine. Each bar 30 has secured in it a number of outwardly extending pointed tines 31 which are long enough nearly to touch the ground as they rotate. There are four tine-carrying bars 30 and they form, as best seen in FIGURE 3, an open-framed carrier for the tines 31, which carrier is driven round by the shaft 26.

At the front of the frame bar 11 in the centre there are means for attachment to the back of a tractor in the form of forwardly-extending lugs 32, 33 which carry transversely mounted pins 34 to engage the tractor draught-arm. This arrangement makes the frame flexible in an up and down direction relatively to the tractor but rigid as viewed in plan, i.e. it partakes of angular steering movements of the tractor chassis.

The lower horizontal cross-tube 11 of the frame also carries a bracket 35 which supports a gear-box 36 for connection from a power-take-off of a tractor. The gear-box 36 contains bevel gearing and drives a cross-shaft 37 extending above the lower horizontal cross-tube of the frame and supported by a bearing at its outer end, beyond which it carries a double-grooved V-pulley 38 in line with the V-pulley on the shaft of the tine-carrier and connected thereto by the two V-belts 28. The result is that the power-take-off of the tractor can operate the tine-carrier and no driving connection from the ground wheels 14 of the tedder is required.

In addition to the central column 15 which connects the upper and lower cross-members of the frame, the lower cross-member carries a pair of upstanding links 40 which are pivoted to a pin passing through the bottom of the column and which, at their upper end, carry a pivoted trunnion bearing 41 in which works the spindle of a crank handle 44 which is integral with a nut 42. The nut 42 engages a screw-threaded member 43 hinged at one end to the top of the column 15. Between the adjustment screw and the lower end of the links, a cross-pin 46 extends between them, adapted to be connected to the tractor. The effect of this screw and nut mechanism is to enable the tines 31 to be adjusted up or down so that they are at the correct spacing from the ground.

Upon the frame, around the tine-carrier, is a cowling 50 of sheet metal which commences at frame level just behind the castor wheels 14 and is curved upwardly and rearwardly and terminates in a horizontal portion 51 behind the tine-carrier and sides having a vertical rear edge. The top of the cowling is connected by a horizontal tube 53 which extends forwardly from it into engagement with the central column 15 of the frame, which gives it rigid support. ide brackets 54 at the rear of the cowling, each support tubular deflectors 55, 56, 57. Each deflector consists of three tubular members which are united at their roots to the bracket 54. The tubular members extend rearwardly from the cowling, the upper one 57 in a direction which is inclined slightly downwards and is also inclined inwards. The second tube 56 is inclined inwards and somewhat more steeply downwards and the bottom tube 55 is also inclined inwards and more steeply down still. To the rear edge of the cowling there is secured a downwardly-tilted plate 59 to direct grass more completely between the deflectors.

As viewed in plan, the tubular deflectors therefore converge toward one another but they leave a space 58 between them through which grass will emerge as it is flung rearwardly by the tines. The ends of the tubes with the deflectors are bent so as to be parallel with the path of the grass. These deflectors guide the grass into the form of a narrow windrow without causing it to be compacted or beaten together, and they depend for their effectiveness upon the tines being driven at a correct speed for flinging the grass through them without permitting them to bring it to rest. A suitable speed of rotation for the tines 31 is about 230 revolutions per minute, assuming that they have a diameter at the tip of about two feet or a little more.

The vertical plates 22 which terminate the frame behind the bearings for the tine-carrier, carry brackets 61 which contain vertical socket 62. In these sockets there are slide rods 63 on the lower ends of which are pivoted circular feet 64. The rods are pierced to receive cross-pins 65 and they constitute parking feet. When lowered, they can be fixed in the lowered position by a cross-pin and will support the tedder if it is disconnected from the tractor. When the tedder is in operation behind the tractor, the parking feet are supported in a raised inverted position as shown in broken lines, by the cross-pins.

The tines 31 are formed in pairs, each tine being made in one piece with two helical springs 66, 67 (FIGURES 3 and 4) which are united by a loop 68 held by a clip 69 bolted to the interior of the channel-shaped tine bar 30. The tines proper project from the helical springs 66, 67 through slots 70 in the tine bar. Two slots for the end pair of tines are made broader, as shown at 71, and this permits the spacing of the end tines to be adjusted. The adjustment is effected by transferring the end pair of tines to an alternative position, that is from fitting through the end slot 70 and first broad slot 71 to the position shown in FIGURE 4 in broken lines, where the end pair of tines enter the two broad slots 71. The slots 71 are made broad to be able to accommodate the tines in both positions. An extra bolt hole is provided between the two broad slots 71 for the clip 69 in the new position. Otherwise bolt holes for the clips 69 are required only between alternate slots 70. The channel-shaped tine bars protect the springs from damage as well as affording a convenient method of fixing.

The construction described gives the tines a certain springiness which is helpful in their action within the cowling 50.

Flanged rings 73 are secured to the inside of the sides 51 of the cowling concentrically with the end-plates 29 and their flanges project over the edges of the end-plates and are located close to these edges so that they tend to prevent the entry of any blades of grass from the crop.

Around the flanged rings 73 there is a spiral guard 74 the location of which can be clearly seen in FIGURE 2 and the detail of the shape of which can be seen from FIGURES 5 and 6. The guard 74 also extends in an axial direction away from the side plate 51 of the cowling and is supported from the side-plate by means of bracket members 80 which are bolted to the plate 51.

The guard 74 extends around the tine-carrier from a point about 45° below the shaft 26 on the rearward side of it, considered in the direction of movement of the tedder (that is to say, the left-hand side as viewed in the drawings) and is curved around about three-quarters of the periphery of the flanged ring 73, the guard 74 terminating above the tine-carrier in a horizontal direction parallel with the roof of the cowling 50.

The width of the guard 74 at its point of commencement 81, FIGURES 5 and 6, is about equal to the axial length of the flanged ring 73 but its edge 82 is, as can be seen in the drawings, more or less helical so that the guard increases in width until at its end portion 83 where it overlies the upper portion of the tedder, it is nearly wide enough to touch the end tine on the tine-carrier.

Also at its commencement the guard 74 is in contact with the flange of the ring 73 but it becomes a little more widely spaced radially from the ring as it proceeds, so that at the off-going end, immediately before it becomes horizontal, it is approximately opopsite the mid-length of the nearest tine on the tine-carrier.

It is found that the use of the ring 73 by itself is not sufficient totally to obviate risk of clogging of the tine-carrier with portions of the crop which may work in between the end-plate 29 and the side of the cowling 50 but the use of the guard 74, particularly in conjunction with the ring 73, forms an effective deterrent to clogging.

I claim:
1. A hay tedder comprising:
   (a) A wheeled body;
   (b) A tine carrier having circular end plates rotatably mounted on the wheeled body;
   (c) A plurality of tines radially mounted on the tine carrier;
   (d) A cowling having closed sides and mounted on the wheeled body and partially enclosing the tine carrier leaving a rearward opening to discharge the hay;
   (e) Means rotating the tine carrier so as to discharge the hay rearwardly; and
   (f) A guard strip mounted on each side of the cowling and comprising a strip of material having a first longitudinal edge fixedly mounted to the cowling, the second longitudinal edge extending toward the tines, a first end of the strip material mounted below the tine carrier and in close proximity to the tine carrier, a second end of the strip material mounted above the tine carrier a distance away from the tine carrier which is greater than the distance between the first end and the tine carrier, the strip traversing circularly along the outside of the tine carrier, the distance between the tine carrier and the strip increasing from the first end to the second end, the width of the strip increasing from the first end to the second end whereby a cam surface is formed on the second longitudinal edge.

2. A hay tedder as recited in claim 1 wherein the second end of the guard strip is extended rearwardly in a tangential direction with respect to the top of the tine carrier.

3. A hay tedder as recited in claim 1 wherein the sides of the cowling each have a circular flange concentric with the axis of the end plates of the tine carrier, the flange in close proximity to the end plate of the tine carrier, the end plate partially inserted within the flange.

References Cited by the Examiner
UNITED STATES PATENTS

| | | | |
|---|---|---|---|
| 2,490,143 | 12/49 | Magee | 56—364 |
| 2,519,799 | 8/50 | Thwaites | 56—372 |
| 2,992,525 | 7/61 | Irish | 56—372 |

FOREIGN PATENTS

| | | |
|---|---|---|
| 1,262,661 | 4/61 | France. |
| 869,700 | 6/61 | Great Britain. |

T. GRAHAM CRAVER, *Primary Examiner*.

RUSSELL R. KINSEY, *Examiner*.